Nov. 2, 1937.   G. TASSO   2,098,071
MOTOR VEHICLE DRIVE
Filed Oct. 6, 1936   2 Sheets-Sheet 1
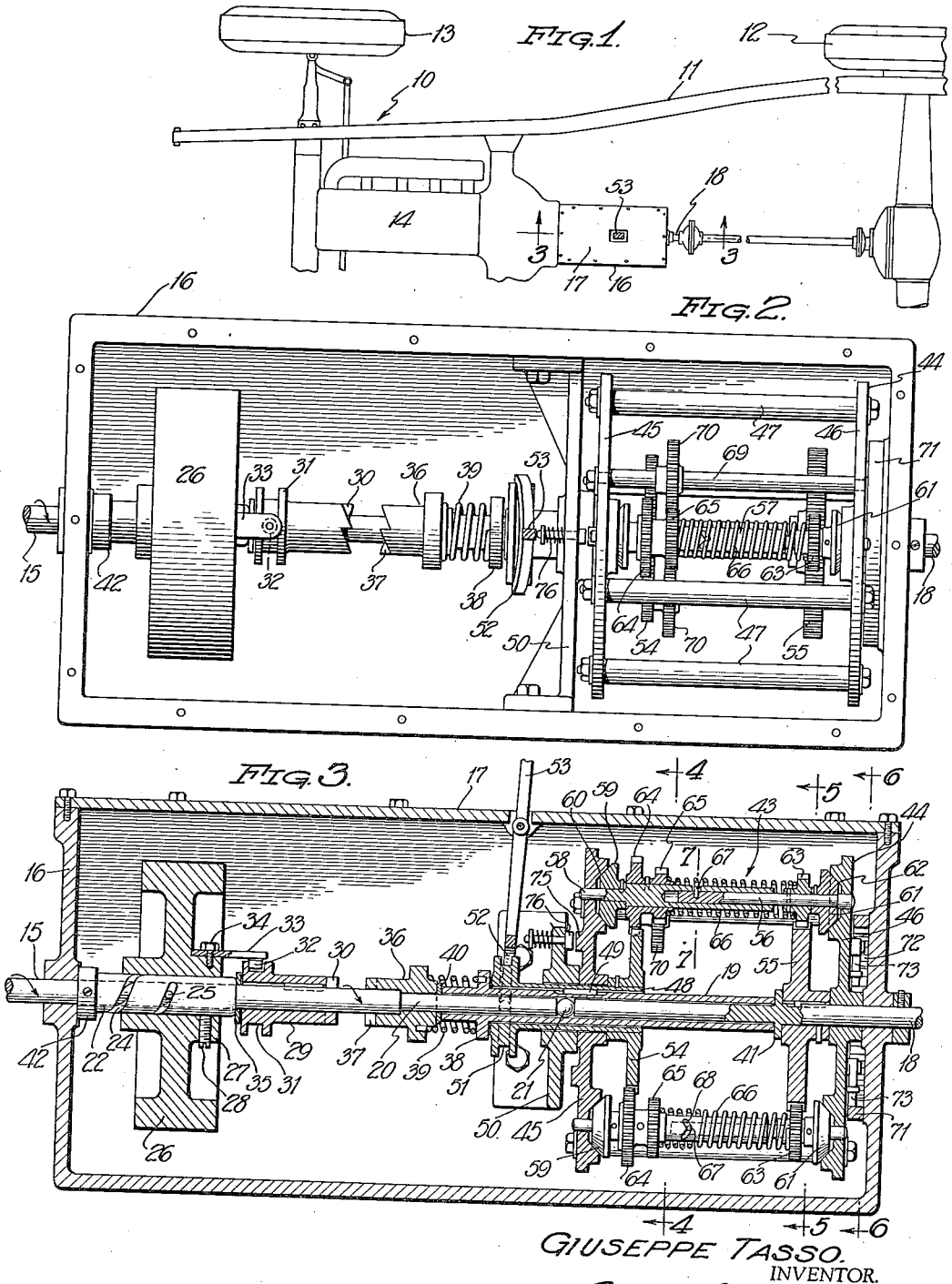
GIUSEPPE TASSO.
INVENTOR.
BY Ely & Pattison.
ATTORNEYS.
WITNESS:

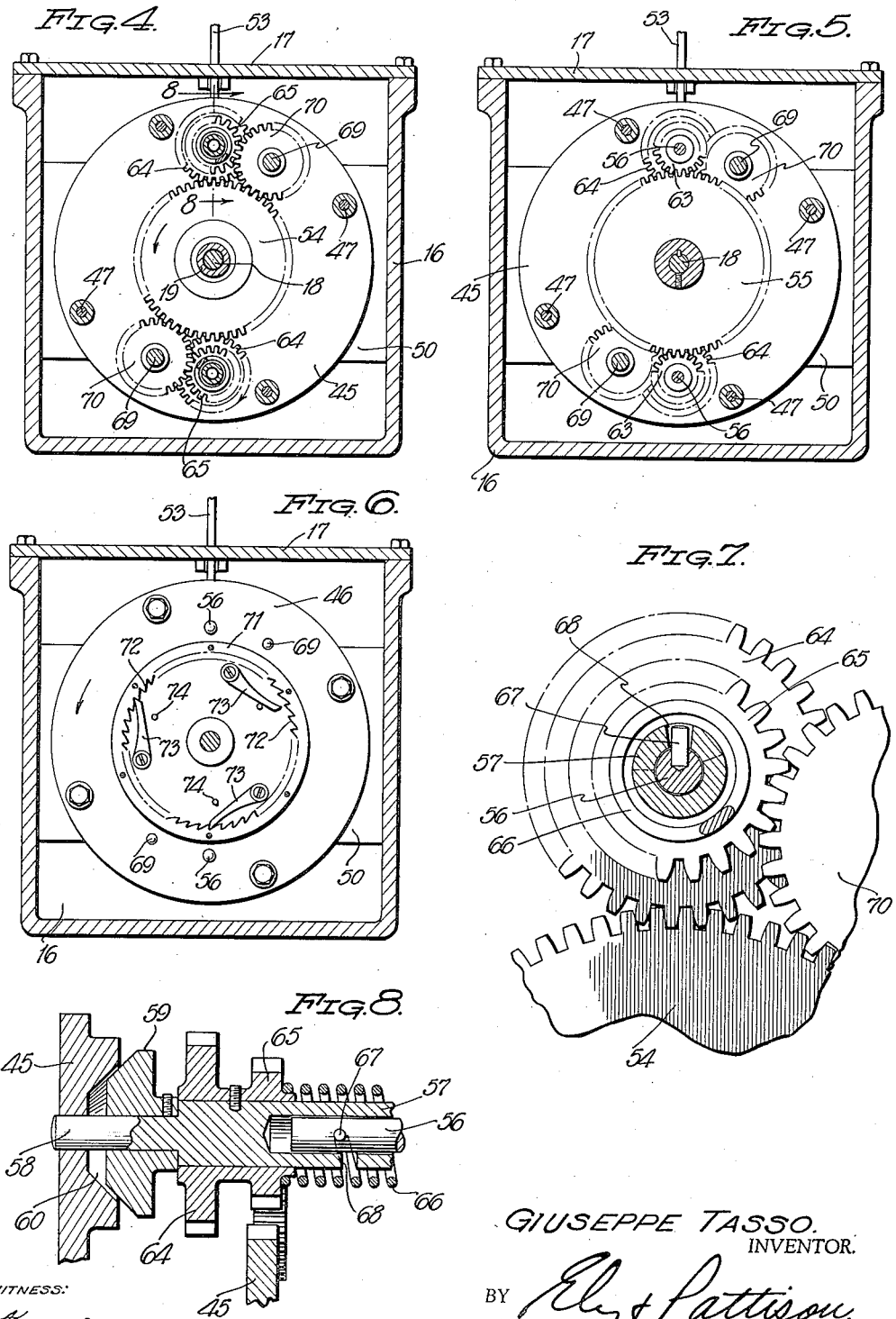

Patented Nov. 2, 1937

2,098,071

UNITED STATES PATENT OFFICE 2,098,071

MOTOR VEHICLE DRIVE

Giuseppe Tasso, Brooklyn, N. Y., assignor of one-half to Irving L. Rollins, Brooklyn, N. Y.

Application October 6, 1936, Serial No. 104,158

10 Claims. (Cl. 74—259)

This invention relates to improvements in motor vehicle drives, and this application constitutes a continuation-in-part application of my present pending application Serial No. 89,342, filed July 7, 1936.

One of the main objects of the invention resides in the elimination of the manual shifting of gears when a motor vehicle is traveling at various forward speeds.

Another feature of the invention is to provide a power transmission drive wherein the load imparted to the traction wheels of the motor vehicle determines the transmission of slow and high rates of speed from the power shaft to the propeller shaft. For instance, a motor vehicle being placed in motion from a standing start will cause the transmission to function in low speed regardless of the engine speed, whereas, upon the gradual increase of speed and forward momentum of the vehicle will lessen the load or pull upon the propeller shaft and cause the transmission to function at high speed.

A further feature of the invention is the provision of a motor vehicle drive in which the acceleration of the engine controls the operative connection between the engine drive shaft and the driven shaft, together with a means for maintaining the drive shaft and driven shaft disconnected when the engine is running at a predetermined idling speed.

A further object of the invention is to provide a motor vehicle drive in which the power transmission is of the planetary type, and which may be manually controlled by the operator for operation at forward and reverse driving speeds, or rendered neutral while the engine is in operation.

A still further object of the invention resides in a motor vehicle drive having the above novel features, which is relatively simple and inexpensive of construction and positive of operation.

With these and other objects in view, the invention resides in the certain novel construction, combination and arrangement of parts, the essential features of which are hereinafter fully described in the following specification, are particularly pointed out in the appended claims, and are illustrated in the accompanying drawings, in which:

Figure 1 is a fragmentary top plan view of the chassis of a motor vehicle illustrating the location of the vehicle drive mechanism.

Figure 2 is a top plan view of the drive mechanism with the housing cover removed.

Figure 3 is an enlarged vertical longitudinal sectional view on the line 3—3 of Figure 1.

Figure 4 is a vertical transverse sectional view on the line 4—4 of Figure 3.

Figure 5 is a vertical transverse sectional view on the line 5—5 of Figure 3.

Figure 6 is a vertical transverse sectional view on the line 6—6 of Figure 3.

Figure 7 is an enlarged detail vertical transverse sectional view on the line 7—7 of Figure 3.

Figure 8 is an enlarged fragmentary vertical sectional view on the line 8—8 of Figure 4, but showing the position of one of the countershaft releasable clutch bearings when in released position.

Referring to the drawings by reference characters, the numeral 10 designates a fragmentary portion of a motor vehicle including a chassis frame 11, a rear driven wheel 12, one of the front steering wheels 13, and an engine or power plant 14. A drive shaft 15 of the engine 14 extends rearwardly therefrom into the front end of a housing 16 within which my improved transmission drive mechanism is wholly closed. The housing 16 may be suspended from the chassis frame 11 in any suitable manner, and the open top thereof is closed by a removable cover plate 17.

Extending through the rear end of the housing 16 and disposed in axial alinement with the drive shaft 15 is the front end of a driven shaft 18, which driven shaft is adapted to be operatively connected with the differential mechanism of the motor vehicle. The forward end of the driven shaft 18 extends partially through a tubular shaft 19, while extending into the tubular shaft from the other end thereof is the reduced end 20 of the engine drive shaft 15. A thrust ball bearing 21 is interposed between the adjacent ends of the shafts 18 and 15.

A thrust sleeve member 22 is slidably mounted on the drive shaft 15 and is provided with a spiral slot 24 which extends inwardly from a point adjacent the front end to a point approximately mid-way thereof. Both ends of the spiral slot are closed and extending thereinto is a pin 25 which projects radially from the drive shaft 15. Mounted on the thrust sleeve 22 is a rotatable member in the form of a fly wheel 26, the same having a hub 27 through which a set screw 28 passes for keying the fly wheel to the thrust sleeve member 22 for turning and sliding movement therewith.

Slidably keyed to the drive shaft 15 and disposed adjacent the inner end of the sleeve member 22 is a slidable clutch element 29, the inner end of which is provided with opposed teeth 30. The outer end of the clutch element 29 is provided with an annular channel 31 into which a roller 32 extends, the said roller being carried by the inwardly extending end of an arm 33 fixedly secured to the hub 27 of the fly wheel such as by a screw 34. A thrust washer 35 is freely mounted on the drive shaft 15 and is interposed between the clutch element 29 and the thrust sleeve member 22.

Slidable on the reduced end 20 of the drive shaft 15 and telescoping the larger portion thereof is a clutch element 36, the outer end of which is provided with opposed teeth 37 which face in the direction of and are adapted to be engaged by the teeth 30 of the sliding clutch element 29 when the latter is thrust inwardly from its normal inoperative position as shown in Figures 2 and 3 of the drawings to its operative position. The forward end of the tubular shaft 19 is provided with an annular collar 38 to which one end of a coupling spring 39 is connected, the opposite end of the said spring being fixedly secured to the rear end of the clutch element 36. A washer 40 encircles the reduced end 20 of the shaft 15 and is interposed between the adjacent end of the clutch element 36 and the forward end of the tubular shaft 19. The rear end of the tubular shaft 19 abuts an annular collar 41 provided on the driven shaft 18.

From the description thus far, it will be understood that when the drive shaft 15 is stationary, or when rotating at a slow idling rate of speed, the fly wheel 26 and sliding clutch element 29 are in retracted position and therefore power from the shaft 15 cannot be transmitted to the tubular shaft 19 for the reason that the thrusting force of the rotating pin 25 acting in the screw slot 24 is insufficient to thrust the sleeve member 22, fly wheel 26, and clutch element 29 inwardly toward the non-sliding clutch element 36. However, when the speed of the engine 14 is accelerated to rotate the drive shaft 15 at an increased rate of speed, the increased force will cause the drive shaft 15 to turn at a greater speed than the fly wheel 26, which causes the pin 25 working in the screw slot 24 to impart an inward thrust to the sleeve member 22, fly wheel 26 and clutch element 29 to cause the coacting clutch elements 29 and 36 to operatively engage, whereby power is transmitted from the drive shaft 15 to the tubular shaft 19 through the resilient coupling of which the spring 39 forms a part. Should the speed of the drive shaft 15 be reduced beyond a predetermined speed, such as when the engine is running at idling speed, or when the engine is entirely shut off, the reduced speed of the drive shaft 15 in proportion to a greater speed of the fly wheel caused by centrifugal force, causes the pin 25 to move the sleeve member 22, fly wheel 26, and clutch element 29 to a retracted position, thus disengaging the coacting clutch elements 29 and 36. It is the differential in speed of rotation between the drive shaft 15 and sleeve 22 having the fly wheel 26 which controls the sliding movement of the clutch element 29 to clutching and declutching engagement with the clutch element 36. Movement of the thrust sleeve 22 to retracted position is limited by a stop collar 42 fixed to the drive shaft 15, whereas movement of the member 22 to extended or clutching position is limited by the inner end of the screw slot 24.

For the purpose of imparting variable speeds of rotation to the driven shaft 18 from the drive shaft 15 when the clutch elements 29 and 36 are engaged, I provide a planetary transmission mechanism 41 which includes a rotor frame 44. The frame 44 consists of a pair of spaced end discs 45 and 46, and spacer rods 47 for maintaining the discs in fixed spaced relation. The front disc 45 has its bearing upon a sleeve member 48, which sleeve member is slidably keyed to the tubular shaft 19 as at 49. The sleeve member 48 is slidable in a bearing 50 which rises upwardly from the bottom of the housing 16 and which bearing is disposed adjacent the forward side of the front end disc 45. The forward end of the sleeve 48 is provided with a grooved collar 51 to which the yoke 52 of a gear shift lever 53 is operatively connected. The rear end of the sleeve 48 extends beyond the rear side of the end disc 45 and has fixed thereto, a drive sun gear 54. Spaced from the drive sun gear 54 is a driven sun gear 55, the latter being keyed to the driven shaft 18 and fitting against the rear side of the collar 41. The planetary gears to be presently described and which coact with the sun gears 54 and 55 are carried by two diametrically opposed countershafts which have their bearings in the end discs 45 and 46 of the rotor frame 44. In view of the fact that each assembly of the planet gears and countershaft are identical in construction, it is believed that a description of one will suffice for the other.

Each countershaft and assembly of planet gears includes an inner shaft 56, one end of which is slidably supported in the end disc 46, while the opposite end of the shaft 56 is slidably received in the outer tubular shaft 57. The forward end of the tubular shaft 57 is formed with a reduced stub shaft 58, the same being slidably supported in the end disk 45. The outer reduced end 58 of the tubular shaft 57 carries a conical clutch element 59 which is engageable with a conical shaped recess 60 provided on the inner side of the end disk 45. The outer end of the inner shaft 56 has a clutch element 61 fixed thereto and which is engageable with the walls of a conical shaped recess 62 provided on the inner side of the end disc 46. Fixed to the shaft 56 adjacent the clutch element 62 is a driven gear 63 which is in constant mesh with the driven sun gear 55. The shaft 57 adjacent the clutch element 59 carries a planetary drive gear 64 which meshes with the driving sun gear 54 when the transmission is in forward speed. Also fixed to the tubular shaft 57 adjacent the gear 64 is a reverse drive gear 65 with which the sun gear 56 meshes when the gear 54 is shifted to reverse driving position. The clutch elements 59 and 61 are normally held in frictional clutching engagement with the walls of the respective recesses 60 and 62 by means of a spring 66, one end of the spring abutting the reverse drive gear 65 and the opposite end of the spring abutting the planet driven gear 63. Extending radially from the shaft 56 is a pin 67, the same entering a V-shaped slot 68 in the tubular shaft 57. The pin 67 is at the apex portion of the V-shaped slot when the clutch elements 59 and 61 are in clutching position but are movable into the opposite branches of the V-slots for the purpose of causing the shafts 56 and 57 to move to a retracted position whereupon the clutch elements 59 and 61 are disengaged from their respective clutch surfaces, thus permitting the entire assembly of the countershaft and planetary gears to be free of movement relative to the rotation of the rotor frame 44.

A shaft 69 is journaled in the rotor frame 44 adjacent each of the shafts carrying the planetary gears and mounted on each shaft 69 is a reversing idler gear 70, the same having constant meshing engagement with a reverse driving gear 65. There is sufficient space between the gears 64 and 65 to enable the sun gear 54 to be moved to a neutral position, or to a position in meshing engagement with the forward drive gear 64 or with the reverse idler gear 70.

For the purpose of preventing retrograde movement of the rotor frame 44, I provide a ring or collar 71 on the inner side of the rear end wall of the housing 16, the inner wall of the ring or collar being provided with ratchet teeth 72. Engageable with the ratchet teeth 72 are gravity pawls 73, the said pawls being limited in their outward movement by stop pins 74. In Figure 6 of the drawings, three ratchet pawls 73 have been shown, and at least one of these pawls is in engagement with the ratchet teeth 72 at some time during rotation of the rotor frame.

For preventing rotation of the rotor frame 44 when the actuating lever 53 has been moved to position the drive sun gear 54 with the reversing idler gear 70, I provide lugs 75 on the outer side of the end disc 45. There may be four of these lugs positioned radially of the end disc, and any one of which is adapted to be engaged by a spring actuated stop 76, the latter being slidably mounted in the bearing 50. The forwardly extending end of the stop member 76 is engageable by the yoke 52 of the actuating lever 53, thus when the lever is moved to slide the driving sun gear 54 into engagement with the reversing gears 70, the yoke 52 will strike the stop member 76 and move the same into the path of one of the stop lugs 75. The arresting of rotation of the rotor frame 44 during reverse speed, and during low speed in forward drive is desired for at such time the shaft of the planet gears are free of clutching engagement with the end discs 45 and 46 of the rotor frame.

In the operation of my motor vehicle drive, assume that a motor vehicle equipped with the same is to be placed in motion from a stationary position. The operator actuates the gear shift lever 53 so as to position the drive sun gear 54 in mesh with the forward planet gear 64. It is assumed that the motor 14 is operating and upon acceleration of the motor, the clutch element 29 is moved up into clutching engagement with the clutch element 36. Rotation is thus imparted from the drive shaft 15 to the driven tubular shaft 19 through the resilient coupling connecting the shaft 19 with the clutch element 36. Power from the tubular shaft 19 is imparted to the sleeve 48 carrying the drive sun gear 54, and rotation of the sun gear 54 imparts turning movement to the gears 64 of the planetary assembly. Due to the load or strain upon the driven or propeller shaft 18, the initial turning movement of the driving sun gear 64 will cause the pins 67 of the shaft 56 to move inwardly of one of the branches of the V-slot 68. Such movement of the pins 67 to one end of the slots 68 causes the shafts 56 and 57 to slide relative to each other in opposite directions, thus retracting the clutch elements 59 and 61. When the shafts are in this released or de-clutched position, the drive gear 54 imparts rotation to the gears 64, shafts 57 and to the shafts 56 through the respective pin and slot connections, thence from the driven planet gears 63 to the driven sun gear 55 to the driven shaft 18. The position of the parts just described constitutes low speed, but just as soon as the forward speed of the motor vehicle increases to a predetermined amount, the strain upon the driven shaft 18 is somewhat relieved, and at which time springs 66 return the shafts 56 and 57 to their normally extended positions, causing the clutch elements 59 and 61 to frictionally engage their respective conical recesses in the end discs of the rotor frame 44. When in this position, the sun gears 64 are locked with the drive sun gear 54, and the planet driven gears 63 locked with the driven sun gear 55. With the planet gears locked to their respective related sun gears and upon continued rotation of the gear 54, the rotor frame 44 is rotated and thus a direct connection is formed between the sun gears 54 and 55. When in this position, the drive from the drive shaft 15 may be said to be direct to the driven shaft 18, thus the shaft 18 will turn at a greater rate of speed. The motor vehicle will run in a direct drive speed so long as the load upon the driven shaft 18 remains at a predetermined amount, but should the vehicle approach a hill where the load upon the driven shaft is increased, the clutch elements 59 and 61 will again be released, thus causing the transmission of power from the drive gear 54 through the planet gears 64 and 63 to the driven sun gear 55. During all forward speeds, the pawls 72 and ratchet ring 71 act to prevent retrograde movement of the rotor frame.

Assume that it is desired to place the transmission into reverse drive, the operator moves the manipulating lever 53 forwardly, thus shifting the driving sun gear 54 into meshing engagement with the reversing idler gears 70 which idler gears mesh with the planet gears 65 and imparts a reversing turning movement to the shafts 59, shafts 56, planet gears 63, and driven gear 55. Thus the shaft 18 will be rotated in a reverse direction. Due to the load upon the shaft 18, the clutch elements 59 and 61 are released when driving in reverse, and the pins 67 enter those branches of the V-slots 68 opposite to those into which the pins entered when in forward drive to effect retraction of the clutch elements 59 and 61. During shifting of the lever 53 to reverse position, the same strikes the spring actuated stop 76 and moves the same into the path of one of the stop lugs 75, thus coacting with the ratchet 71 and pawl 73 for arresting any rotative movement of the rotor 44 with respect to the planet gears.

From the foregoing description, it will be apparent that I have provided a motor vehicle drive wherein the speed of the motor controls the operative connection between the motor shaft and the transmission mechanism, and when these parts are operatively connected, the load or strain upon the driven propeller shaft determines the shifting of the transmission from what may be termed low gear to high gear. This shifting takes place automatically, for the only acts necessary for the operator of the vehicle is to actuate the lever 53 to position the drive gear 54 into either neutral, forward, or reverse speed positions.

My transmission also includes a safety feature, for when installed upon motor vehicles, the same acts as a brake to prevent backward movement of the motor vehicle should the same become stalled upon an inclined surface.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. In a planetary variable speed transmission, a power driving shaft, a driven propeller shaft axially alined with said power driving shaft, a rotor frame journaled for rotation on said driving and driven shafts, a driving sun gear fixed to said power driving shaft, a driven sun gear keyed to said driven propeller shaft, one or more planet shafts carried by said rotor frame, each of said planet shafts comprising a pair of shaft sections slidably keyed together, the outer ends of said shaft sections having their outer ends slidably supported in said rotor frame, planet gears mounted on the respective shaft sections in mesh with the respective sun gears, releasable means normally locking said shaft sections against rotation to cause said rotor to rotate with said power driving gear and impart a direct drive from said driving shaft to said driven propeller shaft, means preventing retrograde movement of said rotor frame, and means operable upon a predetermined magnitude drag upon said propeller shaft for actuating said releasable means to free said shaft sections from locking engagement with said rotor frame to cause a reduced speed to be transmitted from said power driving shaft to said driven propeller shaft through the meshing sun and planet gears.

2. In a planetary variable speed transmission, a power driving shaft, a driven propeller shaft axially alined with said power driving shaft, a rotor frame including end disks respectively journaled for rotation on said driving and driven shafts, means preventing retrograde rotation of said rotor frame, a driving sun gear keyed to said power driving shaft, countershafts having their ends journalled in said end disks, planet gears fixedly secured to said countershafts and respectively meshing with said sun gears, releasable clutch means between the ends of said countershafts and said end disks acting to normally lock said sun gears, planet gears, and rotor frame together to turn as a unit upon rotation of said power driving shaft, and means actuated by a predetermined magnitude of drag upon said propeller shaft for releasing said releasable clutch means to enable rotation of said planet gears and sun gears relative to said rotor frame and relative to each other to impart power from said power driving shaft to said driven propeller shaft through the meshing sun and planet gears.

3. In a planetary system of speed transmission, a driving shaft, a driven shaft axially alined with said driving shaft, a rotor frame having its bearings on the respective shafts, a driving sun gear slidably keyed to said driving shaft, a sun gear fixed to said driven shaft, a pair of diametrically opposed countershafts journaled in said rotor frame, each of said countershafts including a pair of shaft sections slidably keyed together, a forward speed planet gear fixed to one section of each shaft for meshing engagement with said driving sun gear, a planet sun gear fixed to the other section of each shaft, a reverse driven gear fixed to each of the shaft sections to which the forward speed planet gears are fixed, releasable means normally holding said shaft section against rotation, a reverse driving planet gear in constant mesh with each reverse driven gear, shafts journaled in said rotor frame on which the reverse driving gears are mounted, manually actuated means for shifting said slidable driving sun gear into meshing engagement with the forward planet gears for imparting forward rotation to said driven shaft, or with the reverse driving planet gears for imparting reverse rotation to said driven shaft, and means operable upon a predetermined magnitude of drag upon said driven shaft for actuating said releasable means to free said shaft sections for rotation to cause a reduced speed to be transmitted from said driving shaft to said driven shaft.

4. In a planetary variable speed transmission, a power driving shaft, a driven shaft axially alined with said driving shaft, a rotor frame including a pair of connected end plates respectively journaled for rotation on said driving shaft and said driven shaft, a driving sun gear fixed to said driving shaft, a driven sun gear fixed to said driven shaft, one or more planet shafts, each planet shaft comprising a pair of shaft sections slidably keyed together and having their outer ends slidably supported in said end plates, planet gears mounted on the respective shaft sections in mesh with the respective sun gears, clutch elements carried by the outer ends of said shaft sections, complementary clutch elements on said end plates, spring means acting to urge said first mentioned clutch elements into coacting clutching engagement with the respective complementary clutch elements, and means operable upon a predetermined magnitude of drag upon said driven shaft for moving said shaft sections inwardly to release the clutch elements carried thereby from clutching engagement with their complementary clutch elements to cause a reduced speed to be transmitted from said driving shaft to said driven shaft through the meshing sun and planet gears.

5. In a planetary variable speed transmission, a power driving shaft, a driven shaft axially alined with said driving shaft, a rotor frame including a pair of connected end plates respectively journaled for rotation on said driving shaft and said driven shaft, a driving sun gear fixed to said driving shaft, a driven sun gear fixed to said driven shaft, one or more planet shafts, each planet shaft comprising a pair of shaft sections slidably keyed together and having their outer ends slidably supported in said end plates, planet gears mounted on the respective shaft sections in mesh with the respective sun gears, clutch elements carried by the outer ends of said shaft sections, complementary clutch elements on said end plates, spring means acting to urge said first mentioned clutch elements into coacting clutching engagement with the respective complementary clutch elements, a pin and slot connection between the shaft sections, the slot being disposed at an angle with respect to the plane of a line intersecting the axis of the shaft sections at right angle thereto, whereby to release the clutch elements carried thereby from clutching engagement with their complementary clutch elements against the action of said spring means to cause a reduced speed to be transmitted from said driving shaft to said driven shaft through the meshing sun and planet gears.

6. In a planetary system of speed transmission, a driving shaft, a driven shaft axially alined with said driving shaft, a rotor frame having its bearings on the respective shafts, a driving sun gear slidably keyed to said driving shaft, a sun gear fixed to said driven shaft, a pair of diametrically opposed countershafts journaled in said rotor frame, each of said countershafts including a pair of shaft sections slidably keyed together, a forward speed planet gear fixed to one of each shaft sections for meshing engagement with said driving sun gear, a planet sun gear fixed to the other of each shaft section, a reverse driven gear fixed to each of the shaft sections to which the forward speed planet gears are fixed, releasable means normally holding said shaft section against rotation, a reverse driving planet gear in constant mesh with each reverse driven gear, shafts journaled in said rotor frame on which the reverse driving gears are mounted, manually actuated means for shifting said slidable driving sun gear into meshing engagement with the forward planet gears for imparting forward rotation to said driven shaft, or with the reverse driving planet gears for imparting reverse rotation to said driven shaft, and means operable upon a predetermined magnitude of drag upon said driven shaft for actuating said releasable means to free said shaft sections for rotation to cause a reduced speed to be transmitted from said driving shaft to said driven shaft, and means operable upon meshing of said driving sun gear with said reverse driving gear for arresting rotation of said rotor frame to effect releasing operation of said releasable means.

7. In a planetary transmission, a rotor frame having end plates, a planet gear shaft including a pair of axially alined telescoping shaft sections, the outer ends of said shaft sections being journaled in said end plates, planet gears fixed to the respective shaft sections, clutch elements fixed to the respective shaft sections, complementary clutch elements provided on the inner side of said end plates for coacting engagement by the respective clutch elements on said shaft sections, spring means acting to hold the coacting clutch elements in clutching relation, and means interconnecting said shaft sections to cause movement of the same inwardly to effect declutching of the clutch elements upon turning of one shaft section relative to the other.

8. In a planetary transmission, a rotor frame having end plates, a planet gear shaft including a pair of axially alined telescoping shaft sections, the outer ends of said shaft sections being journaled in said end plates, planet gears fixed to the respective shaft sections, outwardly beveled clutch elements fixed to the respective shaft sections, complementary beveled friction surfaces provided on the inner sides of said end plates for friction clutching engagement by the respective beveled clutch elements, spring means acting to hold said beveled clutch elements in clutching engagement with the respective beveled friction surfaces, and means interconnecting said shaft sections to cause movement of the same inwardly to effect declutching of the beveled clutch elements with the beveled clutch surfaces upon turning movement of one of said shaft sections relative to the other.

9. In combination, a planetary transmission system including a rotatable rotor frame having a forward speed planet gear mounted on said rotor frame, a reversed speed planet gear mounted on said rotor frame, a driving sun gear actuating means for selectively moving said driving sun gear into mesh with either said forward speed planet gear or with said reverse speed planet gear, releasable means for locking said forward speed planet gear and said driving sun gear together when in meshing engagement to cause rotation of said rotor frame with said driving sun gear, and means operable upon operation of said actuating means for arresting rotation of said rotor frame for effecting release of said releasable locking means for imparting rotation to said forward speed planet gear from said driving sun gear.

10. In a planetary variable speed transmission, a power driving shaft, a driven propeller shaft axially alined with said power driving shaft, a rotor frame journaled for rotation on said driving and driven shafts, means preventing retrograde movement of said rotor frame, a driving sun gear fixed to said power driving shaft, a driven sun gear keyed to said driven propeller shaft, one or more planet shafts carried by said rotor frame, each of said planet shafts comprising a pair of shaft sections slidably keyed together, the outer ends of said shaft sections having their outer ends slidably supported in said rotor frame, planet gears mounted on the respective shaft sections in mesh with the respective sun gears, releasable means normally locking said shaft sections against rotation to cause said rotor to rotate with said power driving gear and impart a direct drive from said driving shaft to said driven propeller shaft, and means operable upon a predetermined magnitude of drag upon said propeller shaft for actuating said releasable means to free said shaft sections from locking engagement with said rotor frame to cause a reduced speed to be transmitted from said power driving shaft to said driven propeller shaft through the meshing sun and planet gears.

GIUSEPPE TASSO.